United States Patent [19]

Subhedar

[11] 4,004,826
[45] Jan. 25, 1977

[54] LEAF SPRING SUSPENSION SYSTEM

[75] Inventor: Jayant W. Subhedar, Troy, Mich.

[73] Assignee: General Motors Corporation, Detroit, Mich.

[22] Filed: Jan. 8, 1976

[21] Appl. No.: 647,447

[52] U.S. Cl. .............................. 280/718; 267/54 C; 180/71
[51] Int. Cl.² ......................................... B60G 11/04
[58] Field of Search ............. 280/718, 720; 267/54, 267/67, 54 C; 180/71

[56] References Cited

UNITED STATES PATENTS

| | | | |
|---|---|---|---|
| 3,191,711 | 6/1965 | Conner | 180/71 |
| 3,250,546 | 5/1966 | Allison | 280/720 |

FOREIGN PATENTS OR APPLICATIONS

| | | | |
|---|---|---|---|
| 974,930 | 5/1961 | Germany | 280/718 |

*Primary Examiner*—Philip Goodman
*Attorney, Agent, or Firm*—John P. Moran

[57] ABSTRACT

A leaf spring suspension including a support bracket for supporting the front end of the main leaf of a leaf spring assembly, and laterally deflectable beam means extending forwardly from the vehicular side rail at a predetermined angle of, say, 20 degrees, with respect to a vertical plane through the longitudinal axis of the vehicle, and connected to the top surface of the support bracket, for a controlled lateral force compliance characteristic during vehicular turns, as may be desirable for a particular vehicle design.

5 Claims, 5 Drawing Figures

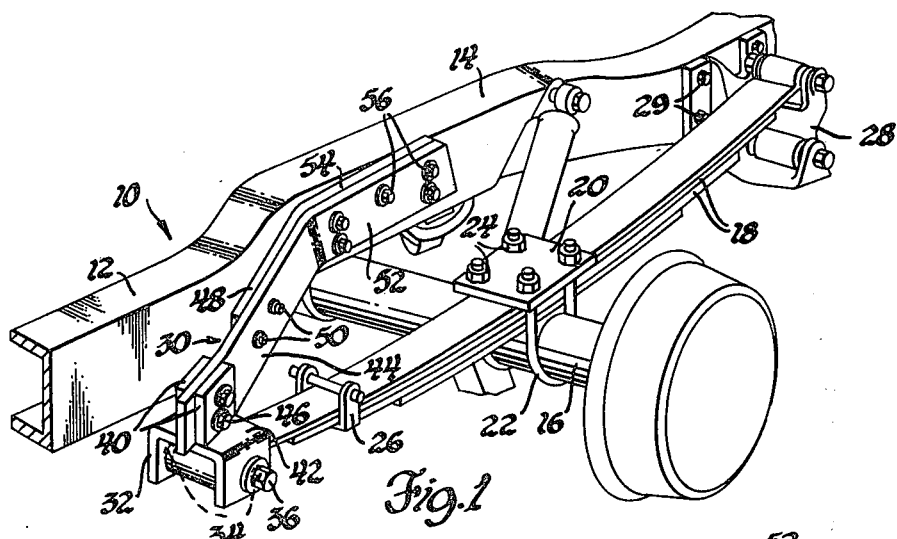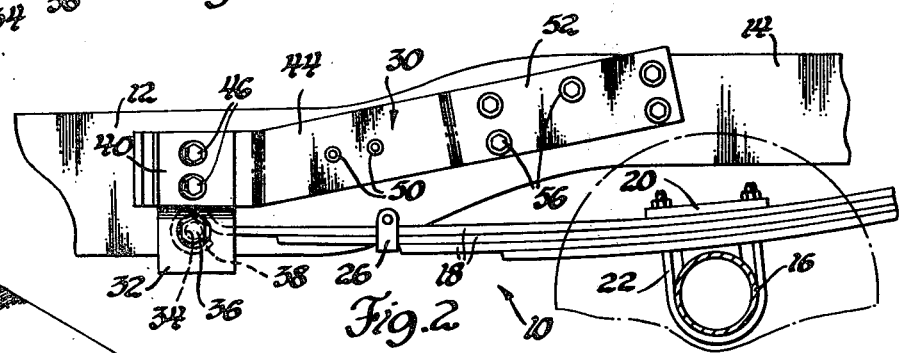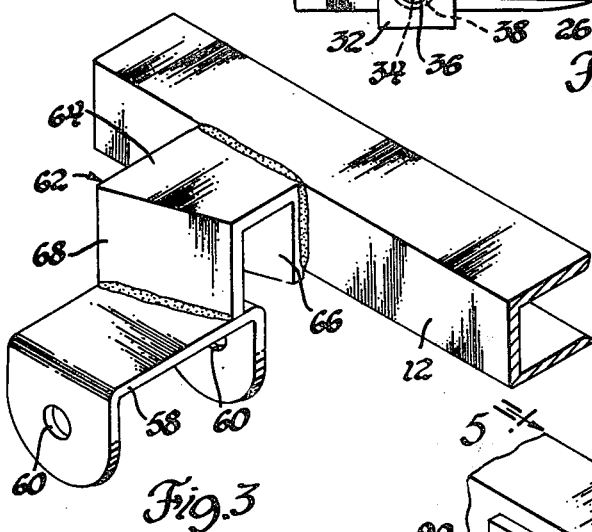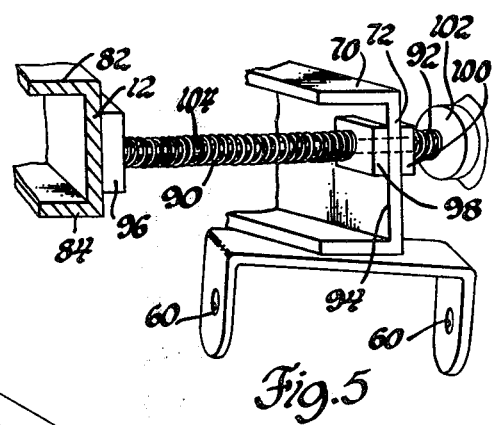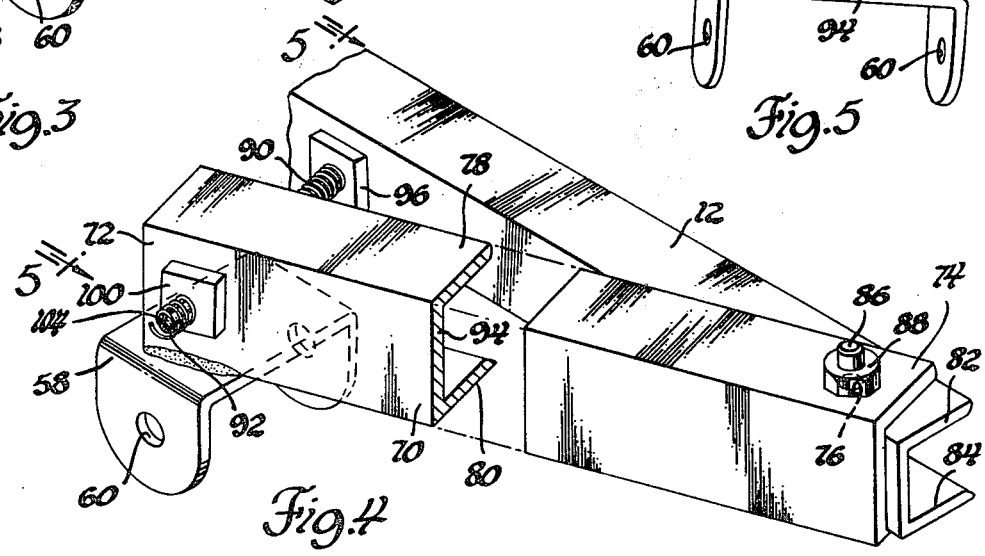

LEAF SPRING SUSPENSION SYSTEM

This invention relates to suspension systems for motor vehicles and, more particularly, to rear leaf spring type suspension systems.

It is desirable for any automobile suspension system to provide a smooth ride over various road conditions, as well as good handling characteristics during turns and lane changing, for example. The amount of steering correction that an operator experiences while changing the course of the vehicle from a steady state straight path to a steady state curved path is dependent upon the relationship between the slip angles developed at both front and rear wheels of the vehicle during the turn. The total change in the front or rear slip angles is the result of a combination of the roll steer, lateral force compliance steer, camber thrusts and the elastic deformation of the tire due to cornering forces developed at the tire road contact patch. This invention provides a new means of controlling the change in slip angle due to the lateral force compliance or deflection of a suspension.

Accordingly, a general object of the invention is to provide an improved leaf spring suspension system which provides controlled lateral force compliance steer characteristics during vehicular turns.

Another object of the invention is to provide an improved leaf spring suspension system including a cantilevered deflectable beam or leaf spring extending from the frame side rail in a vertical plane and at a predetermined angle therewith for supporting one end of a conventional leaf spring stack.

A further object of the invention is to provide an improved rear leaf spring suspension system including a compliant support bracket for supporting the front end of the longest leaf of a leaf spring assembly whose rear end is supported by a conventional shackle secured to the frame side rail and whose central portion is connected in a conventional manner to the vehicle axle, and a laterally resilient or pivotable bracket means operatively connected to the adjacent frame side rail and extending forwardly therefrom at a predetermined angle of, say, 20°, with respect to a vertical plane through the longitudinal axis of the vehicle, and connected to the top surface of the compliant support bracket, for providing an improved lateral force compliance characteristic.

These and other objects and advantages of the invention will be apparent when reference is made to the following description and accompanying drawings, wherein:

FIG. 1 is a fragmentary perspective view of a vehicular frame side rail and axle embodying the inventive leaf spring suspension system;

FIG. 2 is a fragmentary side view of a vehicular frame side rail embodying the invention;

FIGS. 3 and 4 are fragmentary perspective views of two alternate embodiments of the inventive leaf spring suspension system; and FIG. 5 is a fragmentary cross-sectional view taken along the plane of line 5—5 of FIG. 4, and looking in the direction of the arrows.

Referring now to the drawings in greater detail, FIG. 1 illustrates the left one of two rear leaf suspension systems 10, preferably for use on trucks having the usual frame side rail 12 with an upwardly bowed portion 14 traversing over the rear axle 16. The suspension system 10 includes a plurality of conventional stacked leaf springs 18 securely confined at an intermediate point therealong against the rear axle 16 by a plate 20 and oppositely disposed U-bolts 22 and nuts 24, the longitudinal center line of the springs 18 being perpendicular to the axis of the axle 16. An additional clamping member 26 may be employed intermediate the plate 20 and an end of the leaf springs 18 to keep the individual spring aligned.

A conventional shackle 28 and bolts 29 are used to secure the rear end of the uppermost leaf spring 18 to the outboard side of the side rail 12. A compliant front hanger bracket 30 includes a tunnel-shaped bracket or spring support member 32 having oppositely disposed aligned openings 34 formed therein. A bolt 36 is mounted first through one of the openings 34, then through a suitable rubber bushing (not shown) within the cylindrical spring eye or lateral opening 38 (FIG. 2), and thence through the other opening 34.

Spaced parallel uprights 40 are each secured at one end thereof to the upper lateral surface 42 of the support member 32, positioned so as to extend rearwardly at a predetermined angle of, say, 20°, with respect to a vertical plane through the longitudinal axis of the vehicle, or 70° with respect to a vertical plane through the axis of the rear axle 16. A vertically disposed cantilever beam or leaf spring-type bracket member 44 is mounted with one end thereof confined between the spaced uprights 40, wherein it is secured by bolts 46. A second shorter cantilever beam segment or leaf spring member 48 may abut against and be secured by bolts 50 to the longer member 44. The cantilever beams 44 and 48 have respective abutting end-portions 52 and 54 formed parallel to the side rail 12 and secured thereto by a plurality of bolts 56 at a location adjacent an intermediate portion of the length of the stacked leaf springs 18, causing the plane of the interconnected cantilever beams 44 and 48 to meet the adjacent side rail 12 as required to comply with the above-mentioned predetermined angle of 20° with respect to the vehicle longitudinal axis. It is apparent that under side load conditions the leaf spring members 44 and 48 may be caused to deflect at a predetermined rate from their normal 20° relationship with the frame side rail 12.

Specifically, when a vehicle is maneuvered into a left turn, for example, the reaction on the rear axle is toward the left of the vehicle, as a result of centrifugal force on the vehicular body. There would result from such reaction a leftward force on the front end of the front leaf spring bracket 32, as a result of the leaf spring stack 18 being secured at an intermediate point therealong to the axle 16 by the conventional plate 20 and U-bolt 22 type clamping member. The leftward force on the bracket 32 urges the resiliently mounted cantilever beam 44 outwardly from the side rail 12, spreading the original angular relationship with the side rail 12. It is apparent that such leftward force on the bracket 32 end of the beam 44 would result in a force vector perpendicular to the beam 44 and thus somewhat toward the rear of the car, causing the left rear wheel to be positioned a little behind its normal straight-away location with respect to the frame, thus creating an advantageous lateral force compliance steer of the wheel with respect to the automobile body. The reaction on the right rear wheel during the left turn is the opposite of that on the left rear wheel, creating the advantageous lateral force compliance steer of the right wheel with respect to the automobile body. Such steer feature due to lateral force compliance would supplement the advantageous steer gains due to roll, aligning torque and camber compliance characteristics, and facilitate handling of the vehicle during turns and lane changing conditions.

EMBODIMENTS OF FIGS. 3 AND 4

The FIG. 3 embodiment is somewhat comparable to the FIG. 1 arrangement in that the front end portion of a set of leaf springs (FIG. 1) is supported via its cylindrical spring eye or lateral opening 38 in a tunnel-shaped bracket or spring support member 58 having oppositely disposed aligned openings 60, the member 58 and openings 60 being comparable to the respective member 32 and openings 34 of FIG. 1.

A second tunnel-shaped bracket 62 is formed to include a trapezoidal-shaped cover portion or wall 64 and converging side walls 66 and 68, the wall 66 being secured along the outer side surface thereof in any suitable manner, such as by welding, to the adjacent side rail 12. The wall 68 is welded or otherwise secured along its bottom edge to the top surface of the bracket 58, but at a predetermined angle with the longitudinal axis of the bracket 58, such that an extension of the side wall 68 would intersect the side rail 12 at a predetermined angle, as required to comply with the above-mentioned 20° relationship with the longitudinal axis of the vehicle, as was the case with the cantilever beams 44 and 48 and the side rail 12/14 of FIG. 1. It should be realized that, while the wall 68, and, hence, the spring support member 58, are deflectable toward or away from the side rail 12 in response to any side load exerted on the spring support member 58, the deflection is in a canting or inclining manner about the fixed edge between the walls 64 and 68 and, thus, not as desirable as the operation of the FIG. 1 structure.

The FIG. 4 embodiment is comparable to the FIG. 3 structure insofar as the shape and location of the spring support member 58 is concerned. However, the tunnel-shaped bracket 62 of FIG. 3 is replaced by a C-shaped beam 70 which is welded or otherwise secured along the bottom surface of one end 72 thereof to the top surface of the bracket 58, but at some predetermined angle with the longitudinal axis thereof. The other end 74 of the C-shaped beam 70 includes vertically aligned openings 76 formed through the top and bottom walls 78 and 80, respectively.

It may be noted in FIG. 4 that the spread of the top and bottom walls 78 and 80 is such that they straddle the top and bottom walls 82 and 84 of the side rail 12, which have openings (not shown) formed therethrough which align with the openings 76. A bolt 86 is mounted through the openings 76 and the openings in the side rail walls 82 and 84, and is retained therein by a nut 88, thereby securing the C-shaped beam 70 to the side rail 12 at a predetermined angle therewith, in keeping with the above-described 20° relationship with the longitudinal axis of the vehicle.

Suitable oppositely disposed resilient members, such as springs 90 and 92, may be mounted, respectively, between a spring support member 98 secured to the inner surface of the vertical wall 94 of the beam 70, adjacent the end 72 thereof, and a spring support member 96 secured to the side rail 12, and between a spring support member 100 secured to the outer surface of the vertical wall 94 and a suitable fixed abutment 102. A small-diameter rod 104 extends from the support member 96, through an aperture (not shown) formed in the side wall of the beam 70, along the axes of the springs 90 and 92 to the fixed abutment 102. The spring 90/92 arrangement serves to constantly urge the vertical wall 94 of the beam 70 into its preferred angular relationship with the side rail 12, while permitting some degree of freedom of pivotal lateral movement of the spring support bracket 58 at a predetermined rate, about the axis of the bolt 86 in response to any side load on the bracket 58. Outward travel of the end 72 of the beam 70 along the rod 104 is limited by the fixed abutment 102.

It should be noted that pivotal movement of the C-shaped beam 70 (FIG. 4) about the axis of the bolt 86, in response to side loads on the spring support member 58, is a comparable reaction to the deflection of the cantilever beam 44 described above relative to the FIG. 1 arrangement, such reaction resulting in an improved lateral force compliance steer characteristic during vehicular turns.

It's apparent that the support bracket could support the rear end of the longest leaf of the leaf spring assembly instead of the front end thereof, with the laterally deflectable beam means extending rearwardly from the vehicular side rail, at a predetermined angle with the longitudinal axis of the vehicle, to connect to the top surface of such rear support bracket, should such an arrangement be desirable for a particular vehicle design.

What is claimed is:

1. For use with a motor vehicle having a frame, a pair of oppositely disposed rear wheels, and a rigid axle interconnecting said oppositely disposed rear wheels, a rear leaf spring suspension system comprising a leaf spring stack extending along-side a side rail of said frame between said side rail and the adjacent wheel of said pair of wheels, bracket means for securing said leaf spring stack at an intermediate point therealong to said axle, shackle means secured to said side rail and adapted to pivotally support the rear end of the main leaf of said leaf spring stack about the axis of the rear cylindrical spring eye opening of said main leaf, and compliant bracket means operatively connected between said side rail and the front end of said main leaf, said compliant bracket means including a tunnel-shaped spring support member, pivot means connecting said leaf spring front end to said spring support member at the front cylindrical spring eye opening of said main leaf, and a laterally movable member secured at a bottom edge surface thereof to the top surface of said spring support member and at a side surface thereof to said side rail such that said laterally movable member forms a free-state predetermined forwardly and laterally diverging angle with said side rail and is movable toward or away from said side rail during turning operations of said motor vehicle, as a result of the action of centrifugal force on the body of said motor vehicle and the resultant forces and/or moments applied to said rear wheels at the point of contact with the road surface, to provide an improved lateral force compliance steer of said rear wheels during said turning operations.

2. For use with a motor vehicle having a frame, a pair of oppositely disposed rear wheels, and a rigid axle interconnecting said oppositely disposed rear wheels, a rear leaf spring suspension system comprising a leaf spring stack extending along-side a side rail of said frame between said side rail and the adjacent wheel of said pair of wheels, bracket means for securing said leaf spring stack at an intermediate point therealong to said axle, shackle means secured to said side rail and adapted to pivotally support the rear end of the main leaf of said leaf spring stack about the axis of the rear cylindrical spring eye opening of said main leaf, and compliant bracket means operatively connected between said side rail and the front end of said main leaf, said compliant bracket means including a tunnel-shaped spring support member, pivot means connecting said leaf spring front end to said spring support member at the front cylindrical spring eye opening of said main leaf, and a vertically disposed laterally deflectable member secured at a forward bottom edge surface thereof to the top surface of said spring support member and at a rear side surface thereof to said side rail such that said laterally deflectable member forms a free-state predetermined angle with respect to a vertical plane through the longitudinal axis of said motor vehicle, said predetermined angle changing during turning operations of said motor vehicle, as a result of the action of centrifugal force on the body of said motor vehicle and the resultant forces and/or moments applied to said rear wheels at the point of contact with the road surface, to provide an improved lateral force compliance steer of said rear wheels during said turning operations.

3. For use with a motor vehicle having a frame, a pair of oppositely disposed rear wheels, and a rigid axle interconnecting said oppositely disposed rear wheels, a rear leaf spring suspension system comprising a leaf spring stack extending alongside a side rail of said frame between said side rail and the adjacent wheel of said pair of wheels, bracket means for securing said leaf spring stack at an intermediate point therealong to said axle, shackle means secured to said side rail and adapted to pivotally support the rear end of the main leaf of said leaf spring stack about the axis of the rear cylindrical spring eye opening of said main leaf, and compliant bracket means operatively connected between said side rail and the front end of said main leaf, said compliant bracket means including a tunnel-shaped spring support member, pivot means connecting said leaf spring front end to said spring support member at the front cylindrical spring eye opening of said main leaf, and a connector member formed to include a vertically disposed laterally deflectable trapezoidal-shaped top plate and a side wall extending downwardly from oppositely disposed diverging edges of said trapezoidal-shaped top plate, one of said side walls being secured at the bottom edge surface thereof to the top surface of said spring support member and the other side wall being secured at the outer side surface thereof to said side rail such that said one of said side walls forms a free-state predetermined forwardly and laterally diverging angle with said side rail, said one of said side walls being caused to bend toward or away from said side rail during turning operations of said motor vehicle, as a result of the action of centrifugal force on the body of said motor vehicle and the resultant forces and/or moments applied to said rear wheels at the point of contact with the road surface to provide an improved lateral force compliance steer of said rear wheels during said turning operations.

4. For use with a motor vehicle having a frame, a pair of oppositely disposed rear wheels, and a rigid axle interconnecting said oppositely disposed rear wheels, a rear leaf spring suspension system comprising a leaf spring stack extending alongside a side rail of said frame between said side rail and the adjacent wheel of said pair of wheels, bracket means for securing said leaf spring stack at an intermediate point therealong to said axle, shackle means secured to said side rail and adapted to pivotally support the rear end of the main leaf of said leaf spring stack about the axis of the rear cylindrical spring eye opening of said main leaf, and compliant bracket means operatively connected between said side rail and the front end of said main leaf, said compliant bracket means including a tunnel-shaped spring support member, pivot means connecting said leaf spring front end to said spring support member at the front cylindrical spring eye opening of said main leaf, a connector member secured at a forward bottom edge surface thereof to the top surface of said spring support member and pivotally connected at a rear portion thereof to said side rail such that said connector member assumes a free-state predetermined angular position with respect to a vertical plane through the longitudinal axis of said motor vehicle, said predetermined angular position changing during turning operations of said motor vehicle, as a result of the action of centrifugal force on the body of said motor vehicle and the resultant forces and/or moments applied to said rear wheels at the point of contact with the road surface to provide an improved lateral force compliance steer of said rear wheels during said turning operations, and first and second resilient means mounted on opposite sides of said connector member adjacent said forward bottom edge surface thereof for urging said connector member toward said free-state predetermined angular position.

5. For use with a motor vehicle having a frame, a pair of oppositely disposed rear wheels, and a rigid axle interconnecting said oppositely disposed rear wheels, a rear leaf spring suspension system comprising a leaf spring stack extending alongside a side rail of said frame between said side rail and the adjacent wheel of said pair of wheels, bracket means for securing said leaf spring stack at an intermediate point therealong to said axle, shackle means secured to said side rail and adapted to pivotally support one end of the main leaf of said leaf spring stack about the axis of one cylindrical spring eye opening of said main leaf, and compliant bracket means operatively connected between said side rail and the other end of said main leaf, said compliant bracket means including a tunnel-shaped spring support member, pivot means connecting said other leaf spring end to said spring support member at the other cylindrical spring eye opening of said main leaf, and a laterally movable member secured at a bottom edge surface thereof to the top surface of said spring support member and at a side surface thereof to said side rail such that said laterally movable member forms a free-state predetermined laterally diverging angle with said side rail and is movable toward or away from said side rail during turning operations of said motor vehicle, as a result of the action of centrifugal force on the body of said motor vehicle and the resultant forces and/or moments applied to said rear wheels at the point of contact with the road surface, to provide an improved lateral force compliance steer of said rear wheels during said turning operations.

* * * * *